United States Patent
Whight

(10) Patent No.: US 8,547,344 B2
(45) Date of Patent: Oct. 1, 2013

(54) DISPLAY DEVICE WITH TOUCH SCREEN

(75) Inventor: Kenneth R. Whight, Horsham (GB)

(73) Assignee: Chimei Innolux Corporation, Chu-Nan (TW)

( * ) Notice: Subject to any disclaimer, the term of this patent is extended or adjusted under 35 U.S.C. 154(b) by 370 days.

(21) Appl. No.: 12/433,036

(22) Filed: Apr. 30, 2009

(65) Prior Publication Data

US 2010/0060596 A1 Mar. 11, 2010

Related U.S. Application Data

(60) Provisional application No. 61/125,962, filed on Apr. 30, 2008.

(30) Foreign Application Priority Data

Sep. 10, 2008 (EP) ..................................... 08164078

(51) Int. Cl.
  *G06F 3/041* (2006.01)
(52) U.S. Cl.
  USPC .......................................... 345/173; 345/179
(58) Field of Classification Search
  USPC ................................. 345/173–179
  See application file for complete search history.

(56) References Cited

U.S. PATENT DOCUMENTS

| | | | |
|---|---|---|---|
| 5,896,127 A | 4/1999 | Matsufusa et al. | |
| 6,163,313 A | 12/2000 | Aroyan et al. | |
| 6,184,872 B1 * | 2/2001 | Matsufusa et al. | 345/173 |
| 6,380,995 B1 | 4/2002 | Kim | |
| 6,947,102 B2 | 9/2005 | den Boer et al. | |
| 7,030,860 B1 * | 4/2006 | Hsu et al. | 345/173 |
| 2007/0074914 A1 | 4/2007 | Geaghan et al. | |

FOREIGN PATENT DOCUMENTS

| | | |
|---|---|---|
| CN | 1503195 | 6/2004 |
| CN | 101126969 | 2/2008 |
| JP | 2-144716 | 6/1990 |
| WO | 97/18508 | 5/1997 |

* cited by examiner

*Primary Examiner* — Kevin M Nguyen
*Assistant Examiner* — Cory Almeida
(74) *Attorney, Agent, or Firm* — Liu & Liu

(57) ABSTRACT

A display device with touch sensor input has a touch sensor structure on top of the display layer. The touch sensor structure includes a first and second array of electrodes, the electrodes in the first array being non-parallel to the electrodes in the second array. The first and second arrays of electrodes occupy different fractions of a touch sensor area. These asymmetric fill factors give improved sensitivity.

14 Claims, 7 Drawing Sheets

DISPLAY DEVICE WITH TOUCH SCREEN

CROSS-REFERENCE TO RELATED APPLICATIONS

This application claims the benefit of U.S. Provisional Application No. 61/125,962 filed on Apr. 30, 2008, the entirety of which is incorporated herein by reference.

This application claims the benefit of European Patent Application No. 08164078.1 filed on 10 Sep. 2008, the entirety of which is incorporated herein by reference.

BACKGROUND OF THE INVENTION

1. Field of the Invention

This invention relates to display devices with touch screens.

2. Description of the Related Art

Touch screens are becoming increasingly common in consumer electronics applications where an LCD display is present in a device e.g. mobile phone, PDA or camera. User interaction via a touch screen saves the space required for key inputs and therefore allows a larger display area for a given size of device.

Of the possible physical effects used to locate the "touched" position on such a screen, sensing the capacitance change induced between orthogonal sets of electrodes, or between a grounded stylus and individual electrodes, promises the highest resolution while integrating most easily with existing manufacturing processes.

The conventional approach to add touch screen functionality is to simply laminate the necessary electronic structure on top of a display. A potentially cheaper solution that is being investigated is to integrate as much as possible of the touch screen structure into the display. This also has the advantage of adding value to the display itself. In either case, there is a need to maximise the signal so that an accurate "touched" position can be determined.

The signal can be maximised by varying the fill factor of the sensing electrodes (in other words the proportion of the overall area which is occupied by the electrodes) in some way. For example diamond shape pads can be added to a linear array of wires. There are a variety of proposals concerning the best fill shapes to use.

One unavoidable feature of touch screens on displays is that one set of the orthogonal electrodes will be close to an electrical ground plane within the display itself. This tends to reduce the sensitivity, as the ground plane "attracts" electric field lines that would otherwise extend out of the device, these field lines cannot therefore be influenced by touching the screen resulting in the reduced sensitivity.

BRIEF SUMMARY OF THE INVENTION

The invention is directed to this problem, and aims to provide increased touch screen sensitivity in the presence of interference close to one set of sensing electrodes. This interference can be from a ground plane or from pixel electrode circuit beneath the touch sensor arrangement.

According to the invention, there is provided a display device with touch sensor input, comprising:

a display layer; and a touch sensor structure on top of the display layer, comprising a first and second array of electrodes, the electrodes in the first array being non-parallel to the electrodes in the second array, wherein the first array of electrodes occupies a first fraction of a touch sensor area, and the second array of electrodes occupies a different second fraction of the touch sensor area.

The invention provides a display device in which a touch sensor structure is designed with crossing electrodes with asymmetric fill factors. Preferably, a lower fill factor is used for the set of electrodes far from the display structure and a higher fill factor is used for the set of electrodes close to the display layer. The invention is based on the recognition that this configuration gives improved sensitivity, as determined based on modelling the capacitance between such structures. Defining the first array of electrodes as the one closer to the underlying display layer, the first array then preferably has the larger fraction.

The arrays of electrodes can each comprise straight electrode lines with constant width along their length within a touch sensor area, the electrode lines in one array having a different width to the electrode lines in the other array. This is the simplest form of electrode array.

In another arrangement, the arrays of electrodes each comprise straight electrode lines, with enlarged portions along the lines, with a spacing between the enlarged portions corresponding to the pitch between the electrode lines of other array, the enlarged portions in one array having a different size to the enlarged portions in the other array. This gives a 2D array of enlarged portions interconnected with electrode lines. For example, the enlarged portions can be diamond shapes.

These two designs can be combined—with straight rectangular electrodes in one array and electrode lines with enlarged portions in the other array.

The two electrode arrays can have the same pitch, but this is not essential.

The first fraction is preferably at least 0.1 more than the second fraction; it can be at least 0.2 or even 0.3 more than the second fraction. The larger the fraction for the array closest to the display structure, the greater the shielding provided from the electromagnetic signals in the display structure.

The touch sensor structure can comprise a glass substrate between the first and second arrays of electrodes, and an anti-scratch coating over the second electrode array, which is on the opposite side of the glass substrate to the display structure. This forms the top part of the device, closest to the user touch input (finger or stylus). A color filter array can be provided between the display structure and the touch sensor structure, and the display structure can comprise a liquid crystal display.

The display structure can have a top common electrode plane beneath the touch sensor structure, and the invention provides a touch sensor structure which is less influenced by the presence of this ground plane.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

It is to be understood that the following disclosure provides many different embodiments, or examples, for implementing different features of various embodiments. Specific examples of components and arrangements are described below to simplify the present disclosure. These are merely examples and are not intended to be limiting.

The invention provides an arrangement of the electrodes of a touch sensor structure in which the two electrode arrays occupy different fractions of the touch sensor area. This is termed an "asymmetric" electrode design, in which different electrode arrays have different fill factors. The advantage of improved sensitivity is explained below.

Figure 1:
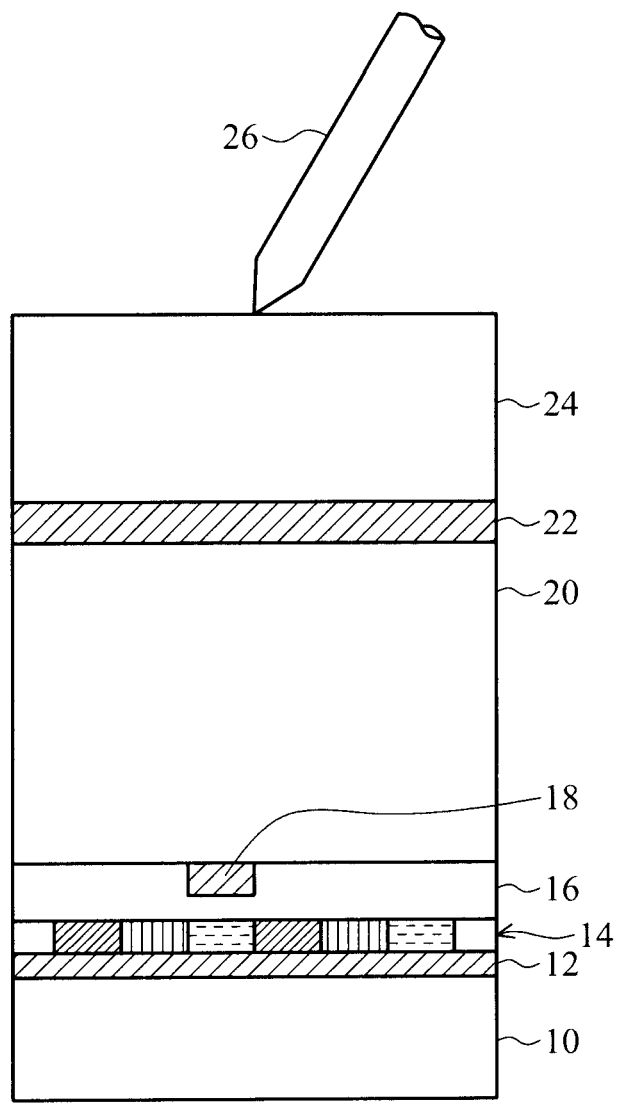
FIG. 1 shows one example of known structure for a display device with touch sensor input and to which the invention can be applied.

FIG. 1 shows one example of known layer structure for a display device with capacitance touch sensor input and to which the invention can be applied.

Part of the display is shown, and this includes at least a display layer. The precise design of display panel is not material to the invention, and for this reason, a detailed description of the display panel is not provided. Typically, the display structure is a liquid crystal display comprising a layer of liquid crystal material sandwiched between substrates. For active matrix displays, the substrates comprise a lower active substrate 10 and an upper passive substrate 20. The passive substrate 20 for example carries a common electrode. The common electrode is shown as 12, and is a common ground plane in the form of a metal layer that is present on the color filter layer 14. Below the common electrode 12 is the layer of liquid crystal sitting on the active glass substrate 10.

Some display technologies e.g. In Plane Switching (IPS) technologies, have all electrical layers on the lower active substrate. This invention still applies, as in that case the touch sensor would still need to be shielded from the varying electric potentials on the active substrate.

Above the color filter layer 14 is a combination of planarising dielectric layer 16 and Y-sense electrodes 18 for the touch sensor.

The layers 12,14,16,18 are, in practice, deposited on the top glass substrate 20. The top glass substrate 20 thus functions as the top passive substrate for the display device as well as the support structure for the touch sensor device.

The X sense electrodes 22 are provided on the opposite side of the substrate 20 to the Y sense electrodes 18, and light polarising layer and an anti scratch layer 24 are provided as the top surface. The stylus or finger that provides the user touch interaction touches the surface of the anti scratch layer and is shown as 26.

FIG. 1 thus shows a display structure with a touch sensor structure on top of the display structure. It will be appreciated that some components of the display structure are integrated with the touch sensor, such as the glass substrate 20, top polarizer 24 and color filters 14. Thus, the structure does not have separately defined display parts and touch sensor parts. However, the general display function (i.e. modulation or production of light) is beneath the general touch sensor function, and the description and claims should be understood accordingly.

FIG. 1 represents just one possible integrated structure. A further level of integration would be to move the X sense electrodes inside the display (i.e. between the substrates). However this would reduce the influence of the stylus on the XY capacitance. FIG. 1 represents the first step towards integrating the touch sensor into the display, but the invention applies equally to designs with a greater level of integration of the touch sensor function with the display function.

Figure 2:
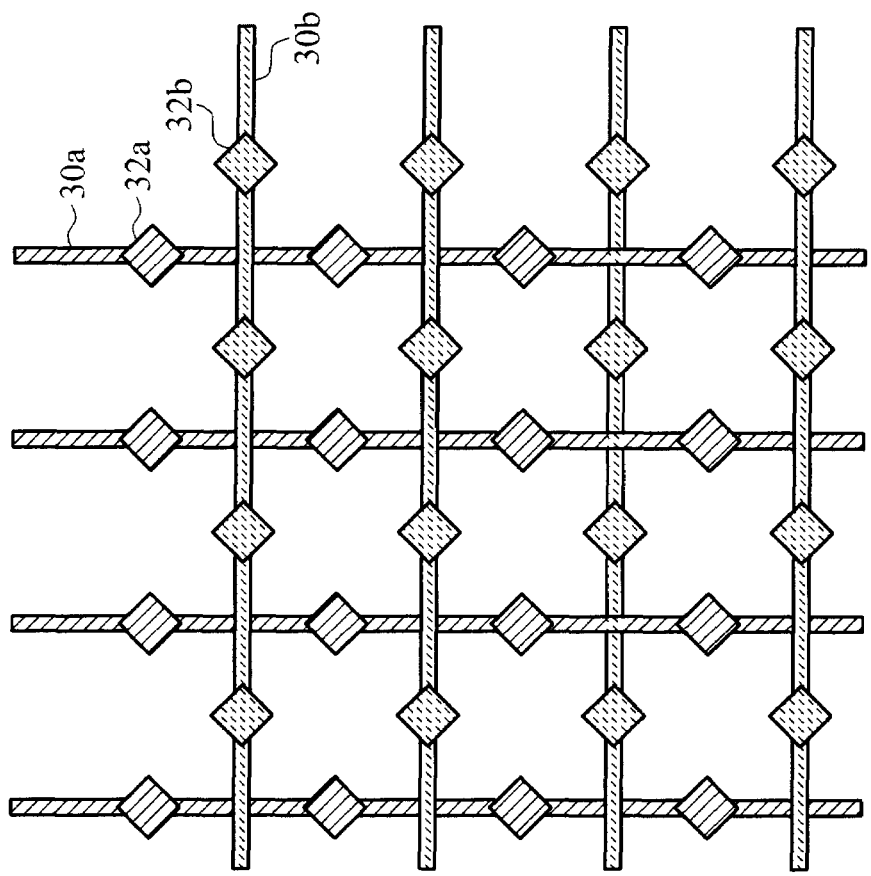
FIG. 2 shows a first known arrangement of electrodes for the touch sensor device.

FIG. 2 shows a first known arrangement of electrodes for the touch sensor device, in the form of straight electrode lines 30a, 30b, with enlarged portions along the lines 32a, 32b. The spacing between the enlarged portions 32a, 32b corresponds to the pitch between the electrode lines of other array, so that a regular array is defined. FIG. 2 shows a symmetric (same pattern on X and Y sensor) wires-with-diamonds pattern.

Figure 3:
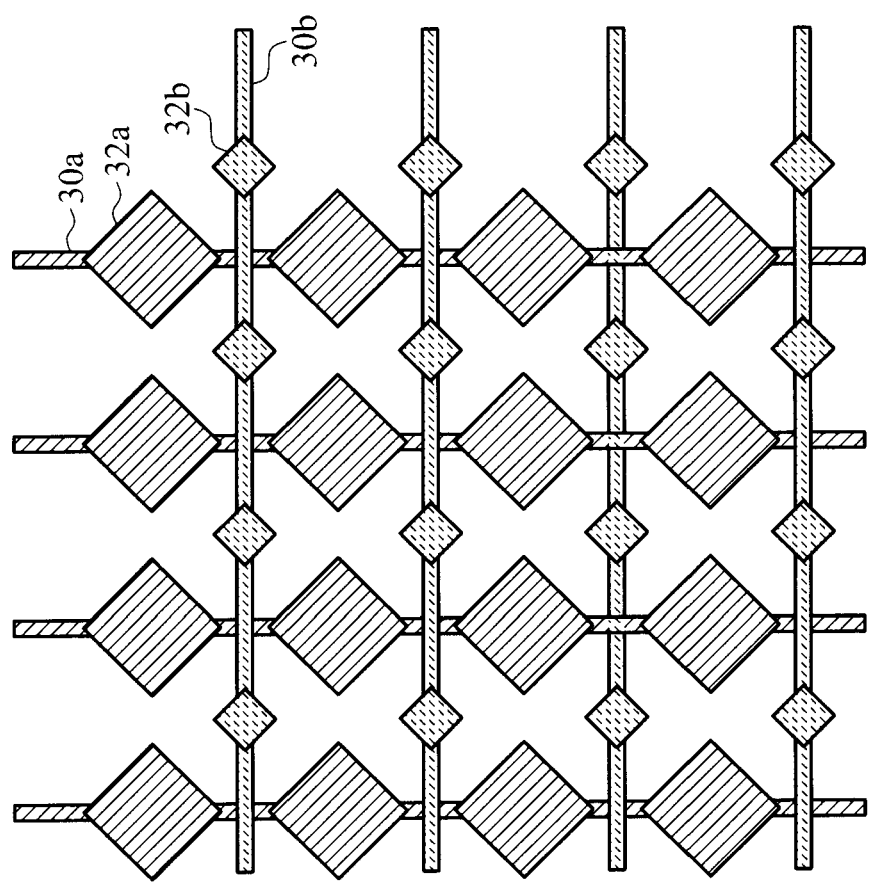
FIG. 3 shows a first arrangement of electrodes for the touch sensor device in accordance with the invention.

FIG. 3 shows a modification to the design of FIG. 2 in accordance with the invention. The enlarged portions 30a in one array (in particular the array nearer the display layer) have a different size to the enlarged portions 30b in the other array.

Figure 4:
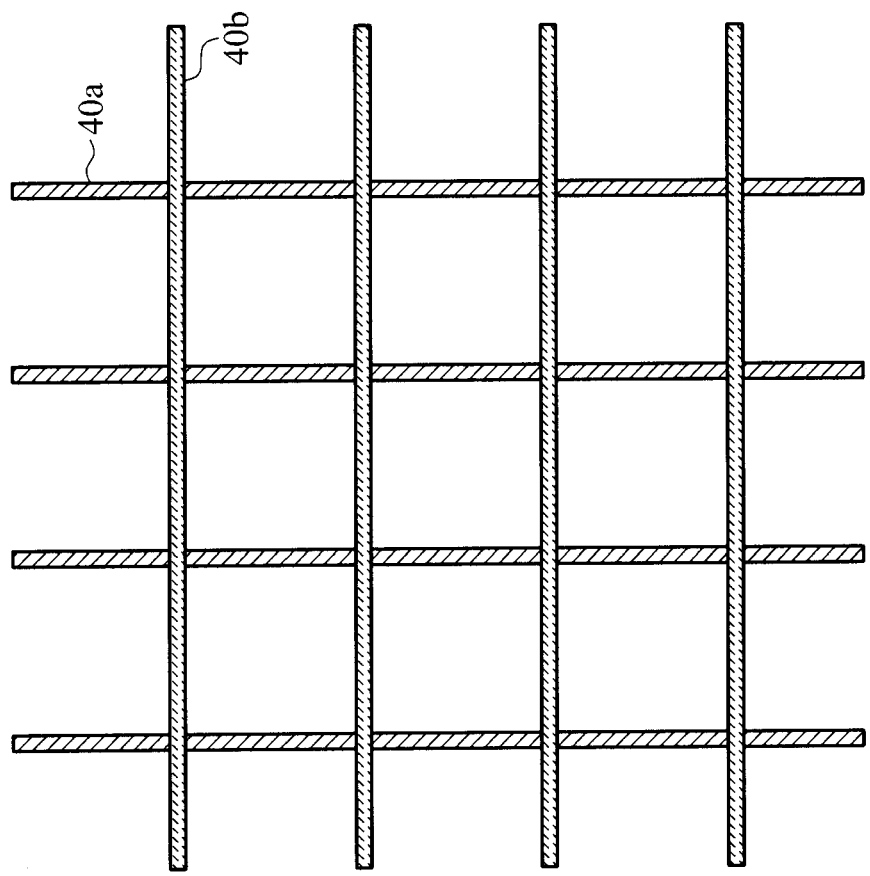
FIG. 4 shows a second known arrangement of electrodes for the touch sensor device.

FIG. 4 shows a second known arrangement of electrodes for the touch sensor device, in the form of straight electrode lines 40a, 40b. FIG. 4 shows a symmetric (same pattern on X and Y sensor) bar pattern.

Figure 5:
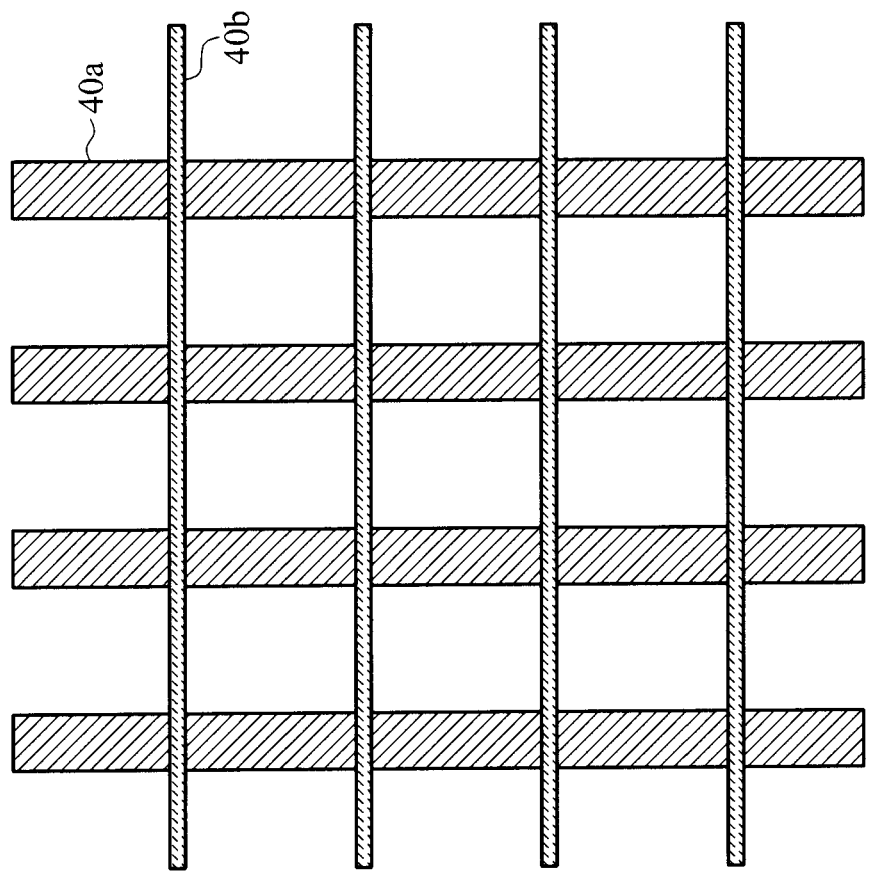
FIG. 5 shows a second arrangement of electrodes for the touch sensor device in accordance with the invention.

FIG. 5 shows a modification to the design of FIG. 4 in accordance with the invention. The bars 40a are wider (again forming the array nearer the display layer).

Figure 6:
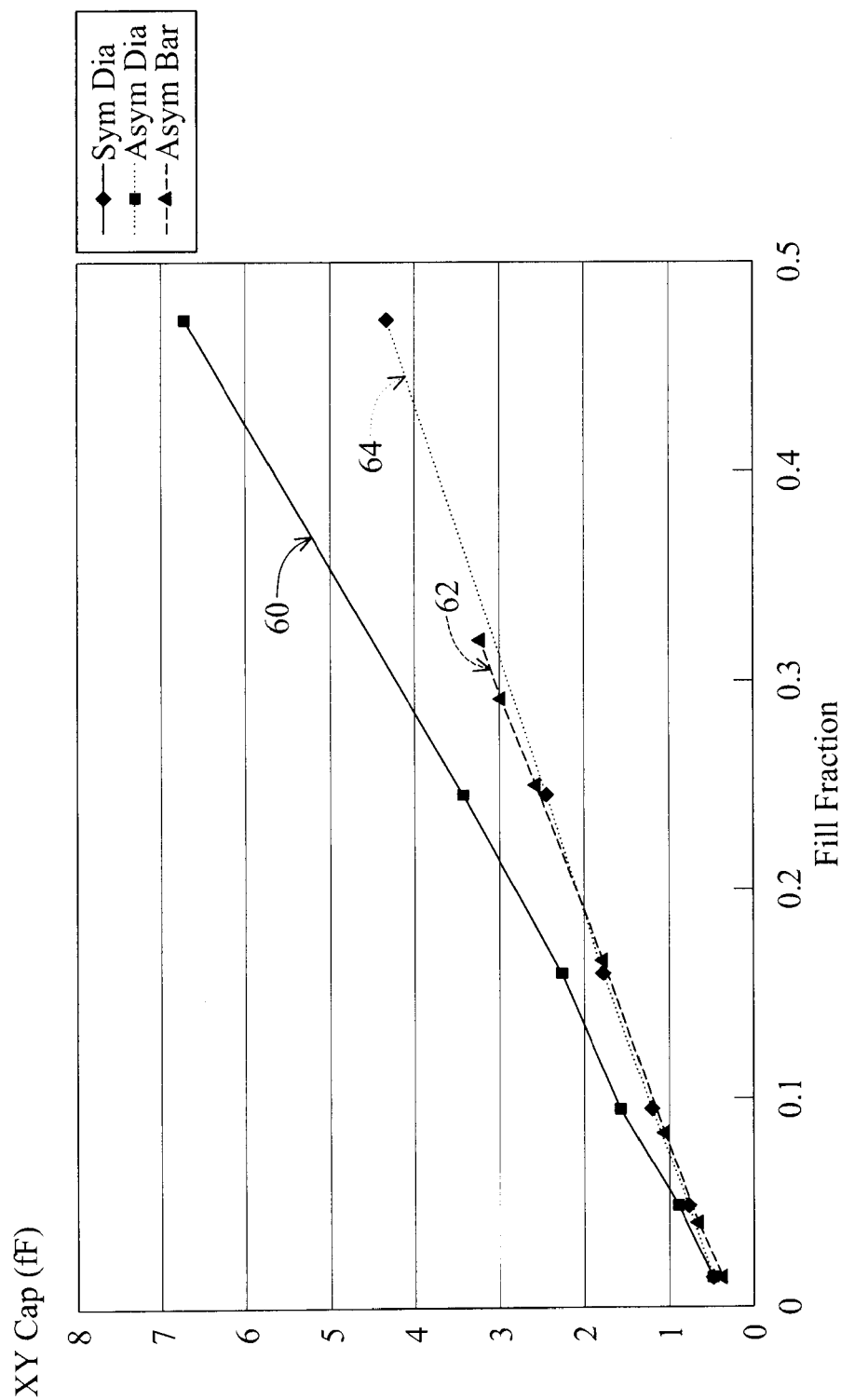
FIG. 6 is used to show how different electrode designs exhibit different capacitance values in the absence of a touch input.
Figure 7:
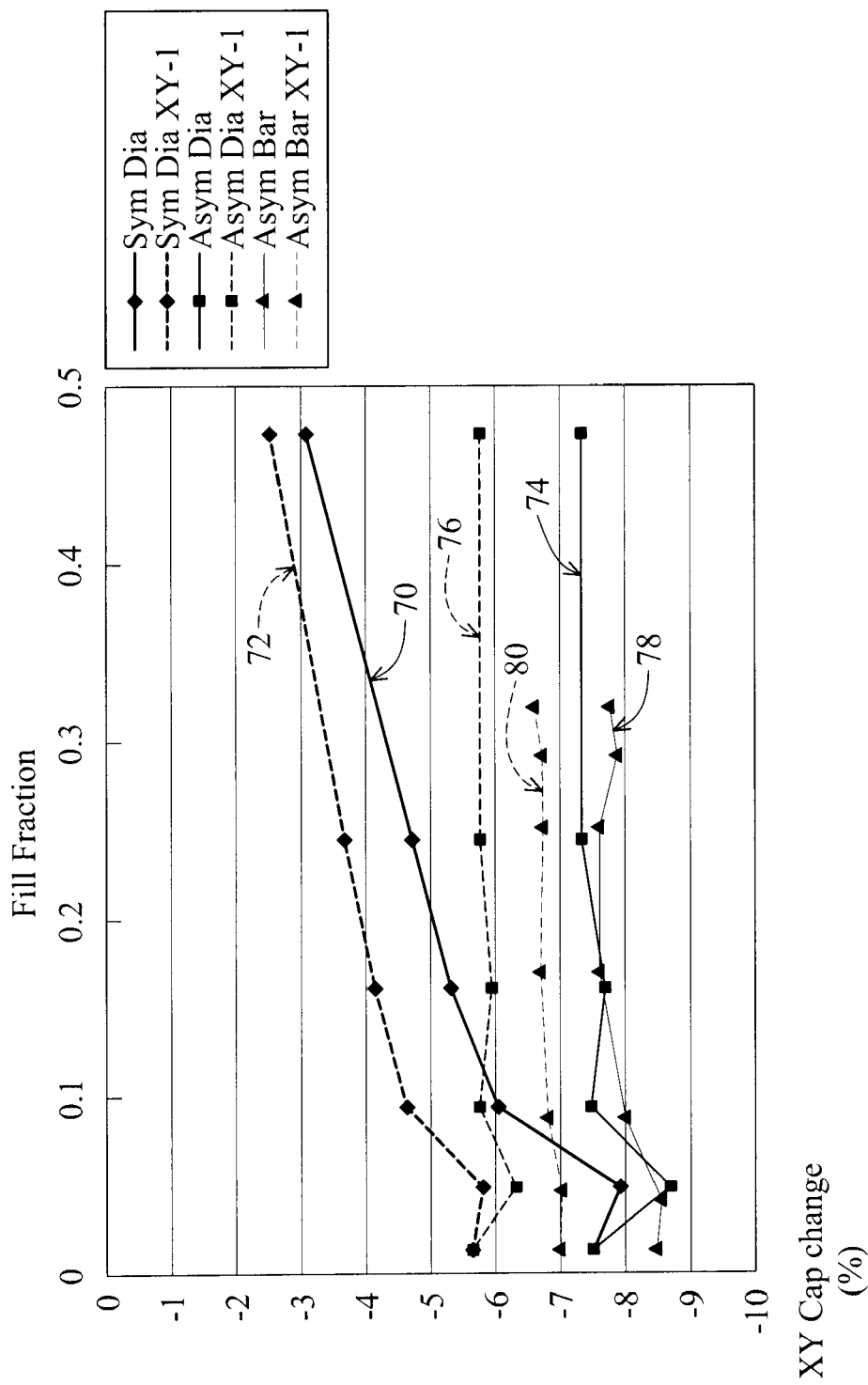
FIG. 7 is used to show how different electrode designs vary their capacitance values in the presence of a touch input.

The various electrode patterns together with the layer structure have been analysed (using a capacitance simulator) and the resulting sensitivity to the presence or absence of the stylus has been computed. FIGS. 6 and 7 summarise the results.

FIG. 6 is used to show how different electrode designs exhibit different capacitance values in the absence of a touch input. It shows the capacitance between the X and Y electrodes. Plot 60 is for a symmetrical diamond pattern (of FIG. 2). Plot 62 is for an asymmetrical diamond pattern (of FIG. 3). Plot 64 is for an asymmetrical bar pattern (of FIG. 5).

For the symmetrical design (plot 60), the fill fraction (x-axis) represents the size of the diamonds for both arrays. For the asymmetrical designs, one array has a constant fill factor (of 0.015, which is where the graphs converge and corresponds to a thin bar of minimum width, with no diamond shapes yet defined) and the fill factor of the other is varied. As shown, the asymmetry means the capacitance does not rise as steeply, as would be expected.

FIG. 7 is used to show how different electrode designs vary their capacitance values in the presence of a touch input, and shows the percentage capacitance change when the stylus is present.

It shows the capacitance change when the stylus (or finger) is introduced, both for the nearest intersection of electrodes and for the neighboring intersection. Plot 70 is for a symmetrical diamond pattern (of FIG. 2) and plot 72 is for the adjacent intersection. Plot 74 is for the asymmetrical diamond pattern (of FIG. 3) and plot 76 is for the adjacent intersection. Plot 78 is for the asymmetrical bar pattern (of FIG. 5) and plot 80 is for the adjacent intersection.

When computing the data for FIGS. 6 and 7, the diamond diagonals and bar widths were varied. In the symmetric case, the diamond sizes where identical on the X and Y electrodes as mentioned above, while in the asymmetric cases the pattern on the lower Y electrode was varied while the upper X electrode remained a thin bar of minimum width.

The data in FIGS. 6 and 7 has been normalised to the fill fraction of the two patterns for ease of comparison.

As can be seen for the symmetric diamond case, as the fill factor increases, the capacitance between the electrodes increases but the percentage change when the stylus is present decreases. It results from the fact that more field lines are trapped between the electrodes as the fill factor increases and less are able to be influenced by the presence of the stylus.

When asymmetric fill patterns are used, while the capacitance between the electrodes increases less rapidly, the percentage change remains almost constant as the fill factor is increased and indeed the bar pattern seems to have an advantage over diamonds. Thus the sensitivity improves as the asymmetric fill factor increases.

The capacitance sensing arrangement has not been described in detail, as an existing conventional arrangement can be used. The capacitor sensing arrangement is for sensing either a capacitance between pairs of electrodes, with one electrode of each sensed pair being from each electrode array, or for sensing a capacitance between an electrode and a grounded stylus.

The invention can be applied to electrode designs other than the examples of straight lines and diamond shapes given above.

In the preferred examples, the electrodes in the different arrays are perpendicular, but this is not essential, providing the two arrays define a crossing array pattern. Essentially, the electrodes need to be non-parallel.

Various modifications will be apparent to those skilled in the art.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display device with touch sensor input, comprising:
   a display layer; and
   a touch sensor structure on top of the display layer, comprising a first and second array of electrodes, the electrodes in the first array being non-parallel to the electrodes in the second array,
   wherein the first array of electrodes occupies a first fraction of a touch sensor area, and the second array of electrodes occupies a different second fraction of the touch sensor area, wherein the arrays of electrodes each comprises straight electrode lines, with enlarged portions along the lines, with a spacing between the enlarged portions corresponding to the pitch between the electrode lines of other array, and wherein in reference to the touch area, the enlarged portions in one array have a different area and a same shape compared to the enlarged portions in the other array.

2. The device as claimed in claim 1, wherein the first array of electrodes is closer to the underlying display layer and has the larger fraction.

3. The device as claimed in claim 1, wherein the arrays of electrodes each comprise straight electrode lines with constant width along their length within a touch sensor area, the electrode lines in one array having a different width to the electrode lines in the other array.

4. The device as claimed in claim 1, wherein the enlarged portions are diamond shapes.

5. The device as claimed in claim 1, wherein the two electrode arrays have the same pitch.

6. The device as claimed in claim 1, wherein the touch sensor structure comprises a glass substrate between the first and second arrays of electrodes, and an anti-scratch coating over the second electrode array, which is on the opposite side of the glass substrate to the display layer.

7. The device as claimed in claim 1, further comprising a color filter array between the display layer and the touch sensor structure.

8. The device as claimed in claim 1, wherein the display layer comprises a liquid crystal layer.

9. The device as claimed in claim 8, comprising a top common electrode plane between the display layer and the touch sensor structure.

10. The device as claimed in claim 1, wherein the electrodes in the first array are all parallel, the electrodes in the second array are all parallel, and the electrodes in the first array are perpendicular to the electrodes in the second array.

11. The device as claimed in claim 1, wherein the touch sensor structure on top of the display layer further comprises:
    a substrate, wherein the first array of electrodes are deposited on the substrate; and
    a color filter layer disposed on the first array of electrodes, wherein in reference to the touch area, the enlarged portions in one array of electrodes are nearer the display layer and have a larger area.

12. The device as claimed in claim 11, wherein the first array of electrodes is closer to the display layer and the first fraction is larger than the second fraction.

13. The device as claimed in claim 12, wherein the first fraction is at least 0.3 more than the second fraction.

14. A display device with touch sensor input, comprising:
    a display layer; and
    a touch sensor structure on top of the display layer, comprising a first and second array of electrodes, the electrodes in the first array being non-parallel to the electrodes in the second array,
    wherein the first array of electrodes occupies a first fraction of a touch sensor area, and the second array of electrodes occupies a different second fraction of the touch sensor area, wherein the arrays of electrodes each comprises straight electrode lines, with enlarged portions along the lines, with a spacing between the enlarged portions corresponding to the pitch between the electrode lines of other array, and wherein in reference to the touch area, the enlarged portions in one array have a different area and a same shape compared to the enlarged portions in the other array, and
    wherein the first fraction is at least 0.3 more than the second fraction.

* * * * *